US006303237B1

(12) United States Patent
Forsberg et al.

(10) Patent No.: US 6,303,237 B1
(45) Date of Patent: Oct. 16, 2001

(54) FERRITIC ALLOY FOR CONSTRUCTIONS

(75) Inventors: Urban Forsberg, Sandviken; Johan Lindén, Gävle, both of (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/485,123

(22) PCT Filed: Aug. 10, 1998

(86) PCT No.: PCT/SE98/01455

§ 371 Date: Feb. 4, 2000

§ 102(e) Date: Feb. 4, 2000

(87) PCT Pub. No.: WO99/07908

PCT Pub. Date: Feb. 18, 1999

(30) Foreign Application Priority Data

Aug. 12, 1997 (SE) .................................................. 9702910

(51) Int. Cl.[7] ...................................................... B32B 15/18
(52) U.S. Cl. .......................... 428/681; 138/143; 148/325; 148/519; 148/592; 420/57; 420/67; 428/682; 428/683; 428/684; 428/685; 428/686; 428/924; 428/925
(58) Field of Search ..................................... 428/681, 682, 428/683, 684, 685, 686, 924, 925; 138/143; 420/43, 44, 46, 50, 52, 55, 56, 57, 59, 67, 117, 118, 119, 120, 123, 128, 428, 583, 584.1, 586.1, 588; 148/325, 327, 336, 337, 442, 909, 519, 592

(56) References Cited

U.S. PATENT DOCUMENTS

| 3,895,940 | * | 7/1975 | Bieber | 420/57 |
| 3,932,175 | * | 1/1976 | Streicher | 420/67 |
| 4,463,061 | | 7/1984 | Otoguro et al. | 428/683 |
| 4,964,926 | * | 10/1990 | Hill | 148/325 |
| 5,167,933 | | 12/1992 | Norsk | 422/148 |
| 6,010,581 | | 1/2000 | Rosén et al. | |

FOREIGN PATENT DOCUMENTS 0 440 258   8/1991  (EP) .

OTHER PUBLICATIONS

U.S. application No. 09/379,616, Rosén et al., filed Aug. 24, 1999.

U.S. application No. 09/485,120, Lindén et al., filed Apr. 6, 2000.

Stahl, et al., "Survey of Worldwide Experience with Metal Dusting," Presented at the AIChE Ammonia Safety Symposium, Tucson, Arizona; Sep. 1995; pp. 2–20.

Grabke, et al., "Metal dusting of High Temperature Alloys," Werkstoffe und Korrosion, vol. 44 (Dec./1993); pp. 89–97.

* cited by examiner

*Primary Examiner*—Robert R. Koehler
(74) *Attorney, Agent, or Firm*—Burns, Doane, Swecker & Mathis, L.L.P.

(57) ABSTRACT

A compound tube including a layer of a Fe—Cr alloy and a layer of load-carrying component, with the optional addition of further layers. The Fe—Cr alloy preferably has a composition including, in weight-%: less than 0.3% carbon, 15–60% chromium, less than 10% nickel, less than 5% molybdenum, less than 5% silicon, less than 0.3% nitrogen, less than 5% manganese, and the remainder iron with naturally occurring impurities. The compound tubes are very resistant to carbonization and metal dusting, and are suited for use as bayonet tubing, superheater tubing, and reforming tubing in steam formation environments.

9 Claims, No Drawings

FERRITIC ALLOY FOR CONSTRUCTIONS

The present invention relates to the use of a ferritic iron chromium alloyed construction material for the production of multi layered compound tubes, which must meet the demands for good resistance against oxidation, carburisation and so called "metal dusting" in applications such as bayonet tubes, superheater and reformer tubes in steam reforming plants. The invention also relates to the compound tubes per se. Such an outer or inner material component is especially advantageous in a co-extruded tube, where the inner, alternatively the outer, material component consists of a conventional steel or a nickel base alloy with good strength.

With compound tube is intended a tube consisting of two layers with so called metallurgical bonding between the components. Metallurgical bonding is necessary in order to maintain a good thermal conductivity. The compound tube is made by so called co-extrusion.

Steam reforming means the process steps for the production of so called synthesis gas, for generation of for instance ammonia, methanol and hydrogen gas, where water vapour is mixed with hydrocarbons in order to form hydrogen gas and carbon oxide. With reformer tubes are meant the catalyst filled tubes in which steam and hydrocarbons are converted wholly or partially to hydrogen gas and carbon oxide at high temperatures. Bayonet tubes are in this context a type of tubes placed inside the reformer tubes and function as a heat exchanger as the process gas which flow through them emits its heat to the gas which flows on the outside. Superheater tubes are placed, in the form of coils or cores, after the reformer and are used in order to cool down the process gas by super heating of steam.

The solutions, which are used today for bayonet tubes, superheater and reformer tubes, where metal dusting constitutes a problem, are generally nickel base alloys or stainless steels. However, these materials have limited resistance against metal dusting, which gives a shortened length of life or results in that non optimum process parameters for the exchange must be used in the steam reforming. The nickel base alloys are further very expensive due to high amounts of alloying elements and demanding manufacturing processes.

A first aim with the present invention is consequently to develop a more resistant product to a lower cost than the present solutions. This aim has been achieved by using alloys having a composition according to the present invention in the production of compound tubes.

The production of the compound tube is done in a way that the two different components are made to bars in a conventional manner. The bars are drilled and turned with close tolerance demands and are put together to a co-extrusion blank. The corrosion protective ferritic iron chromium alloyed material usually constitutes between 20–50% of the total wall thickness.

The blank is heated to a temperature between 900 and 1200° C. and is co-extruded into a tube. The co-extruded tubes cools in air in order to minimise bent tubes due to thermal tensions created during the cooling. Cold working operations (cold rolling) to finished dimension follows if necessary.

During the co-extrusion process the metallurgical bonding is created. This, like the layer thickness of both the components; is attested by means of a control of the finished product ready for delivery.

The present invention is based on the discovery that compound tubes in specific alloying combinations can fulfil all the demands set on construction materials intended to be used as bayonet tubes and superheater and reformer tubes in steam reforming plants. The demands that must be satisfied are good resistance against metal dusting, oxidation resistance, sufficient mechanical properties (as strength) and structure stability.

Testing in laboratory scale and in production plants has shown that the ferritic iron chromium alloy is superior to the materials normally used today in steam reforming plants. Previously known materials are described in for instance Stahl and Thomsen: Survey of Worldwide Experience with Metal Dusting, presented at the AIChE symposium on ammonia safety, Tucson, Ariz., Sept. 18–20, 1995; Grabke, Krajak and Muiller-Lorenz: Werkstoffe und Korrosion 44:89–97 (1993), and Richardson: Nitrogen No. 205, September–October 1993.

The invention includes the use of an iron chromium alloy with ferritic structure and containing, in weight-%:

| LEVEL[1] | 1 | 2 | 3 |
| --- | --- | --- | --- |
| carbon | <0.05 | <0.10 | <0.3 |
| chromium | 20–30 | 15–40 | 15–60 |
| nickel | <2 | | <10 |
| molybdenum | <2 | | <5 |
| silicon | <2 | | <5 |
| nitrogen | <0.05 | <0.10 | <0.3 |
| manganese | <2 | | <5 |
| iron | | rest (except usual impurities) | |

[1]Level 3: suitable content
Level 2: preferred content
Level 1: specially preferred content The alloy above will constitute the, for corrosion by metal dusting and carburisation, exposed component in a compound tube made by co-extrusion, where the other, load carrying component consists of a lower alloyed carbon steel, a so called 9–12% chromium steel, a conventional stainless steel or a nickel base alloy. Which of the components is the outer or inner component depends on if the process gas flows on the in- or outside of the tube.

The environments where metal dusting and carburisation arise are characterised by a high carbon activity and a relatively low oxygen partial pressure in the process gas, and a normal temperature of 450–900° C. In order to be resistant against this type of corrosion a metallic material is required to have a good ability to form a protective oxide on the surface. Decisive for this ability is mainly the content of the oxide forming element in the material and the micro structure of the material. Due to the relatively low oxygen content in the gas, only three types of protective oxides can practically be formed in the actual environment: aluminium oxide, chromium oxide and silica. Steel alloys or nickel base alloys with aluminium or silicon in order to promote formation of these types of oxides result in deteriorated ductility of the alloy, which makes the making very difficult. The diffusion of the oxide forming element to the surface is critical, why it is a prerequisite in the actual temperature region that the alloy has a micro structure with a ferritic matrix.

The ferritic iron chromium alloyed material of the invention has on the other hand very low strength at high temperatures and can also be embrittled during operation by formation of so called sigma phase. It is therefore not suitable for use in applications that work under mechanical stress. The low strength makes further that it is easily deformed by creep, which is negative for instance for protection against metal dusting, since the protective oxide is easily broken up. That means that the ferritic iron chromium alloyed material as such can not be used as bayonet tubes, superheater and reformer tubes in steam reforming plants.

The joining of corrosion resistant ferritic iron chromium alloyed material, which usually constitutes 20–50% of the total wall thickness, with an alloy with high strength in the form of a compound tube, so that that the iron chromium alloyed material is exposed to the corrosive process gas, a product that manages both the demands on resistance to metal dusting and mechanical hot strength is obtained. The tubes may have an outer diameter of 15–200 mm and a total wall thickness of 2–20 mm.

The choice of load carrying component, i e the component on which the ferritic iron chromium alloyed corrosion protection steel shall be applied, depends on the working temperature and the mechanical stress of the component. Besides demands on strength there are demands on resistance against oxidation in combustion gases or water vapour for the load carrying component. It can generally be said that the oxidation properties become more decisive the higher the working temperature of the component. Oxidation resistance is generally achieved by alloying with chromium. Suitable alloys for the load carrying component are therefore at higher($T \geq 550°$ C.) temperatures, austenitic stainless steels or Ni—Cr-alloys. At lower temperature ($T \leq 600°$ C.) lower alloyed steels, so called 9–12% chromium steels might be suitable as load carrying component.

An example of a suitable load carrier for the type of compound tube, to be used at temperatures above 600° C., is Alloy 800H (Fe-30Ni-20Cr-0.4Al-0.4Ti). It is characterised by good creep strength and structure stability, which makes it suitable for use in pressurised applications. It has further a good oxidation resistance, which makes it resistant to for instance combustion gases.

An example of a suitable load carrier for the type of compound tube, to be used at temperatures below 600° C., is alloy SS142203 (Fe-0,15C-9Cr-1Mo). It is characterised by good hot strength and is approved for use in pressurised applications. It has further a good oxidation resistance, which makes it resistant to for instance combustion gases at the actual temperature.

Below follows a short report on the influence of each element in the final steel alloy. The influence of the elements does obviously decide the desired min.- and max.-contents according to the level overview above.

C, N: too high carbon/nitrogen content has a negative influence on the load carrying component. Carbon/nitrogen diffuses into it during operation, which results in a deteriorated ductility (brittleness).

Cr: the chromium content should be >5%, and preferably >15%, in order to make formation of protective chromium oxide possible. Too high chromium content results in great working problems.

Ni: nickel is austenite stabilising, i e at too high content the matrix is no longer ferritic, which is a prerequisite in order to form a protective oxide layer. Ni is further an expensive alloying element and should therefore be kept low.

Mo: high content of Mo can result in formation of a melted oxide at high temperatures, which reduces the metal dusting resistance of the material. Mo is also expensive.

Mn: is like nickel austenite stabilising, i e at too high content the matrix is no longer ferritic, which is a prerequisite in order to form a protective oxide layer.

Si: too high silicon content is embrittling and results in great working problems.

EXAMPLE 1

A steel melt with composition A (the alloy according to the invention) according to table 1 was made in a conventional way by melting of scrap in an electric arc furnace, refining and decarburisation in an AOD converter and continues casting to size 265×265 mm. The continuously casted blank was then hot rolled to round bar of size Ø144 mm. From this bar a 520 mm long blank was cut, which was turned to an outer diameter of 120 mm, and in which a Ø93 mm through hole was drilled.

A steel melt with composition B, which is intended for the load carrying component, according to table 1, was made in the same manner as melt A, but was instead hot rolled to round bar of size Ø120 mm. From this bar a 520 mm long blank was cut, which was turned to an outer diameter of 93 mm, and in which a Ø45 mm through hole was drilled.

The two inserts were joined by placing the blank of melt B inside the blank of melt A, whereafter the two components were co-extruded at 1100° C. to a tube with an outer diameter of 48 mm and a wall thickness of 4.5 mm. The tube was annealed and then step rolled to outer diameter Ø31.8 and wall thickness 3.0 mm.

The finished tube had an outer component with the thickness 1.17–1.30 mm and an inner with the thickness 1.54–1.74 mm. These variations are normal and totally acceptable.

Ring widening testing, which means that short tube pieces are widened by being pressed down on a conical mandrel that forces the ring (the tube piece) to expand, was performed to check the ductility of the tubes. All tested rings passed the demand for 20% widening.

Flattening test, which means that cut tube pieces are pressed together in radial direction, was also performed to check the ductility of the tubes. All tested tube pieces managed flattening from 31.8 to 9 mm, which is approved.

Tensile testing of complete tube sections, i e both components, resulted in:

| | |
|---|---|
| Yield point Rp0.2: | 352–380 MPa |
| Rupture limit Rm: | 573–592 MPa |
| Rupture elongation A50: | 40.2–42.6% |

Since the two components have different strength, these values are constituted by a mean value of the contribution from each component. The values can be considered normal and shows that the finished tube has approved properties.

TABLE 1

(values in weight %)

| Charge | % C | % Si | % Mn | % Cr | % Ni | % Mo | % Al | % Ti | % N |
|---|---|---|---|---|---|---|---|---|---|
| A | 0.19 | 0.44 | 0.88 | 26.44 | 0.43 | 0.06 | 0.003 | 0.01 | 0.16 |
| B | 0.065 | 0.43 | 0.56 | 20.80 | 31.09 | 0.03 | 0.45 | 0.40 | 0.017 |

EXAMPLE 2

A steel melt with composition C according to table 2 was made in a conventional way by melting of scrap in an electric arc furnace, refining and decarburisation in an AOD converter and continues casting to size 265×265 mm. The continuously casted blank was then hot rolled to round bar of size Ø185 mm.

From this bar a 775 mm long blank was cut, in which a Ø117 mm through hole was drilled.

A steel melt with composition D, which is intended for the load carrying component, according to table 2, was made in the same manner as melt A, but was instead hot rolled to round bar of size Ø138 mm. From this bar a 775 mm long blank was cut, which was turned to an outer diameter of 117 mm, and in which a Ø81 mm through hole was drilled.

The two inserts were joined by placing the blank of melt D inside the blank of melt C, whereafter the two components were co-extruded at 1100° C. to a tube with an outer diameter of 89 mm and a wall thickness of 7.5 mm. The tube was annealed and then step rolled to outer diameter 63 and wall thickness 5.0 mm. By this, a finished tube with an outer component with the thickness 3.6 mm and an inner with the thickness 1.4 mm, was achieved.

The finished tube was tested with non destructive ultrasonic sound testing. No defects, for instance in the so called bonding zone between the inner and outer component, were found.

TABLE 2

(values in weight %)

| Charge | % C | % Si | % Mn | % Cr | % Ni | % Mo | % Al | % Ti | % N |
|---|---|---|---|---|---|---|---|---|---|
| C | 0.17 | 0.59 | 0.78 | 26.70 | 0.26 | 0.02 | 0.003 | 0.01 | 0.18 |
| D | 0.067 | 0.59 | 0.53 | 20.15 | 30.20 | 0.08 | 0.46 | 0.53 | 0.014 |

The compound tubes made according to the invention has an, until now unattained, resistance to petal dusting and a long adequate length of life.

What is claimed is:

1. A method of use of an iron chromium alloy with a ferritic microstructure, the iron chromium alloy includes in weight-%:

carbon: <0.3, chromium: 15–60, nickel: <10, molybdenum: <5, silicon: <5, nitrogen: <0.3, manganese: <5, and the rest iron, apart from naturally occurring impurities;

wherein the method comprises forming a compound tube comprising a layer of a load carrying material and a layer of the iron chromium alloy.

2. Use according to claim 1, where the chromium content is between 15 and 40 weight-%.

3. Use according to claim 1, where the nickel content is <2 weight-%.

4. Use according to claim 1, where the silicon content is <2 weight-%.

5. Use according to claim 1, where the nitrogen content is <0.10 weight-%.

6. Compound tube including at least one layer of an iron chromium alloy, and at least one layer of a load carrying component, wherein the iron chromium alloy has the following composition in weight-%:

carbon: <0.3, chromium: 15–60, nickel: <10, molybdenum: <5, silicon: <5, nitrogen: <0.3, manganese: <5, and the rest iron, apart from naturally occurring impurities.

7. Compound tube according to claim 6, wherein the outer diameter of the tube is between 15 and 200 mm and that it has a total wall thickness of between 2 and 20 mm.

8. Compound tube according to claim 6, wherein the layer of the iron chromium alloy mentioned constitutes 20–50% of the total wall thickness.

9. Compound tube according to claim 6, in the form of bayonet tubing, superheater tubing, or reformer tubing.

* * * * *